United States Patent
Awad (10) Patent No.: US 12,194,786 B2
(45) Date of Patent: Jan. 14, 2025

(54) FLAT TIRE AIRBAG SYSTEM

(71) Applicant: Adam Awad, San Antonio, TX (US)

(72) Inventor: Adam Awad, San Antonio, TX (US)

(*) Notice: Subject to any disclaimer, the term of this patent is extended or adjusted under 35 U.S.C. 154(b) by 117 days.

(21) Appl. No.: 17/944,023

(22) Filed: Sep. 13, 2022

(65) Prior Publication Data

US 2024/0083199 A1 Mar. 14, 2024

(51) Int. Cl.
*B60C 17/02* (2006.01)
*B60C 5/22* (2006.01)

(52) U.S. Cl.
CPC .............. *B60C 17/02* (2013.01); *B60C 5/22* (2013.01)

(58) Field of Classification Search
CPC ......... B60C 17/00; B60C 17/01; B60C 17/02; B60C 19/00; B60C 19/12; B60C 19/127; B60C 5/00; B60C 5/02; B60C 5/08; B60C 5/20; B60C 5/22; B60C 23/00; B60C 23/001; B60C 23/00354; B60C 23/02; B60C 23/04; B60C 23/06; B60C 23/10; B60C 23/12; B60C 23/121; B60C 23/124; B60C 23/125; B60C 23/16; B60C 7/22
USPC ....... 152/195, 203, 204, 205, 206, 516, 518, 152/519
See application file for complete search history.

(56) References Cited

U.S. PATENT DOCUMENTS

| | | | |
|---|---|---|---|
| 1,340,608 A * | 5/1920 | Helm .................. | B60C 19/122 152/203 |
| 1,384,814 A * | 7/1921 | Weaver ................ | B21D 5/042 72/319 |
| 1,456,829 A * | 5/1923 | Ratelle ................ | B60C 19/122 152/204 |
| 2,560,609 A | 7/1951 | Hulzen | |
| 3,511,294 A | 5/1970 | Bepristis et al. | |
| 3,724,521 A | 4/1973 | Coddington et al. | |
| 4,008,743 A | 2/1977 | Welch | |
| 4,164,250 A * | 8/1979 | Shichman .......... | B60C 17/02 152/519 |
| 4,254,810 A | 3/1981 | Shichman | |
| 5,301,729 A | 4/1994 | Blair | |
| 5,385,191 A | 1/1995 | Aflague et al. | |
| 6,367,528 B1 * | 4/2002 | Colantonio ........ | B60C 19/00 152/516 |
| 8,381,785 B2 | 2/2013 | Losey | |
| 2004/0065398 A1 * | 4/2004 | Sapir ................. | B60C 17/00 152/519 |

(Continued)

FOREIGN PATENT DOCUMENTS

| | | | | |
|---|---|---|---|---|
| CN | 103380010 A | * | 10/2013 | ........ B60C 15/028 |
| GB | 102347 A | * | 11/1916 | |

OTHER PUBLICATIONS

Ishiguro H, CN-103380010-A, machine translation. (Year: 2013).*

*Primary Examiner* — Sedef E Paquette
(74) *Attorney, Agent, or Firm* — Eric Karich; Karich & Associates (57) ABSTRACT

A flat tire airbag system has an inner tube having an inner portion adapted to be mounted upon the wheel of the pneumatic tire, and an outer portion adapted to support the tire when inflated. A tire pressure monitoring system is operably mounted to monitor pressure within the pneumatic tire, and an airbag inflation mechanism is provided for automatically inflating the inner tube responsive to the tire pressure monitoring system detecting a loss of pressure within the pneumatic tire.

11 Claims, 6 Drawing Sheets

(56) References Cited

U.S. PATENT DOCUMENTS

| | | | |
|---|---|---|---|
| 2004/0216903 A1* | 11/2004 | Wierenga | A62C 35/023 |
| | | | 169/85 |
| 2005/0109439 A1* | 5/2005 | Droegemueller | B60C 23/004 |
| | | | 152/519 |
| 2011/0030867 A1* | 2/2011 | Kyle | B60C 23/004 |
| | | | 152/519 |
| 2011/0073231 A1 | 3/2011 | Kouno | |
| 2014/0172251 A1* | 6/2014 | Championnet | B60C 23/062 |
| | | | 701/51 |
| 2018/0117975 A1* | 5/2018 | Choi | G01C 21/3691 |
| 2019/0176423 A1 | 6/2019 | Kimura et al. | |
| 2020/0122502 A1* | 4/2020 | Trouw | B60B 21/12 |

* cited by examiner

FLAT TIRE AIRBAG SYSTEM

BACKGROUND OF THE INVENTION

Field of the Invention

This invention relates generally to anti-flat devices for recovering from a flat tire, and more particularly to a flat tire airbag system that automatically inflates upon a puncture of a pneumatic tire.

Description of Related Art

The prior art teaches many examples of dual chamber tires, which function so that the inner chamber supports the tire in the event that the outer chamber becomes deflated. Aflague, U.S. Pat. No. 5,385,191, for example, teaches a pneumatically-inflated inner tube having two compartments such that if one compartment is damaged and deflates, the other compartment may be inflated without removing the tire. This inner tube would typically be used on bicycles, where re-inflating the tire with a pump may be accomplished without removing the inner tube.

Shichman, U.S. Pat. No. 4,254,810 teaches a pneumatic tire having a "run-flat" capability. The tire includes an inner tube covered by an expandable nail-deflector. The nail deflector has multiple components releasably attached with tabs, constrained in a normal condition when the tire is puncture-free, wherein the tire and nail deflector are annularly spaced from the interior of the tire. The tire and nail deflector are circumferentially self-expandable into engagement with the interior of the crown region upon puncture of the tire by a nail. A single dual inflation valve allows inflation of both the tire and the inner tube, at the same time.

Welch, U.S. Pat. No. 4,008,743 teaches a pneumatic tire with an inflatable tube that expands and provides emergency support between the tire tread and the wheel rim if the tire loses inflation pressure. The inflatable tube is protected by an outer circumferential belt comprising one or more superposed layers of cord reinforced strips (e.g., steel, textile), the belt being secured to the safety structure in a relatively narrow central circumferential zone so that radial expansion of the toroidal safety structure is readily accommodated should the tire lose inflation pressure. The belt bears between the inner surface of the tread portion of the tire and the safety structure in the event of tire deflation or underinflation and thus guards against puncture. In a second embodiment, the inflatable tube is replaced by a flexible resilient foam member.

Coddington, U.S. Pat. No. 3,724,521 teaches an anti-flat device for a tubeless pneumatic tire that is similar to Welch, wherein an inner tube is restrained by a folded and stitched fabric band to prevent the inner tube from filling the tire until the air pressure in the tire is reduced below a predetermined value, at which point the band unfolds thereby permitting the inner tube to expand and provide operable support for the tire. Other similar systems are shown in Hulzen, U.S. Pat. No. 2,560,609, Blair U.S. Pat. No. 5,301,729, Kouno, U.S. 2011/0073231, and Kimura, U.S. 2019/0176423.

The prior art teaches various forms of tires that protect against flats. However, the prior art does not teach a flat tire inflatable airbag system that immediately and automatically inflates upon puncture of a pneumatic tire, or other loss of pressure, such as from a nail or other form of road hazard. The present invention fulfills these needs and provides further advantages as described in the following summary.

SUMMARY OF THE INVENTION

The present invention teaches certain benefits in construction and use which give rise to the objectives described below.

The present invention provides a flat tire airbag system for use with a pneumatic tire. The flat tire airbag system includes an inner tube having an inner portion adapted to be mounted upon the wheel of the pneumatic tire, and an outer portion adapted to support the tire when inflated; a tire pressure monitoring system operably mounted to monitor pressure within the pneumatic tire; and an airbag inflation mechanism for automatically inflating the inner tube responsive to the tire pressure monitoring system detecting a loss of pressure within the pneumatic tire.

A primary objective of the present invention is to provide a flat tire airbag system having advantages not taught by the prior art.

Another objective is to provide a flat tire airbag system that enables a pneumatic tire to be immediately restored to a fully inflated condition in the event of a blowout of other loss of air pressure.

A further objective is to provide a flat tire airbag system that enables a driver to continue driving until replacement of the pneumatic tire is convenient and safe.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a flat tire airbag system that automatically inflates upon a puncture of a pneumatic tire so that a blowout is avoided and so that the driver can continue to safely drive until it is safe and convenient to change the pneumatic tire.

Figure 1:
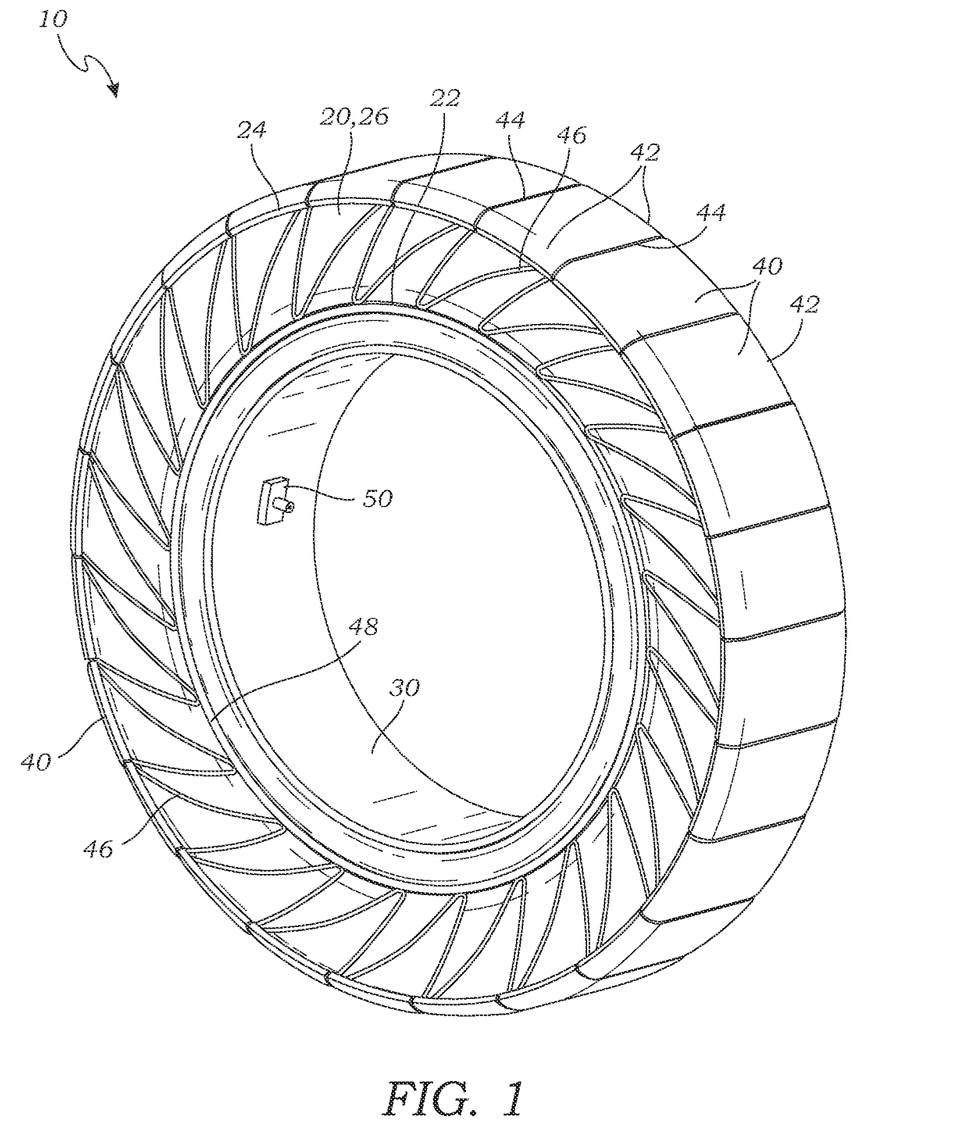
FIG. 1 is a perspective view of a flat tire airbag system according to one embodiment of the present invention, illustrating the flat tire airbag system in an inflated configuration.

FIG. 1 is a perspective view of a flat tire airbag system 10 according to one embodiment of the present invention. FIG. 1 illustrates the flat tire airbag system 10 in an inflated configuration, shown without a pneumatic tire in this Figure for greater clarity. As shown in FIG. 1, the flat tire airbag system includes an inner tube 20 that is initially deflated, as discussed below, but may be inflated as shown in FIG. 1 to support a pneumatic tire in case of a flat. The inner tube 20 includes an inner portion 22 adapted to be mounted upon the wheel of the pneumatic tire (as discussed below and shown in FIGS. 4-5), and an outer portion 24 adapted to support the tire when inflated (also as discussed below). The inner tube 20 in this embodiment has an annular construction, and is adapted to be inserted into the pneumatic tire, as discussed below.

In the embodiment of FIG. 1, the flat tire airbag system 10 includes an inner belt 30 that is disposed inside of the inner portion 22 of the inner tube 20, the inner belt 30 being configured to tightly conform the wheel of the pneumatic tire. In one embodiment, the inner belt 30 is constructed of neoprene or other suitably flexible and elastic material. In another embodiment, the inner belt 30 may be an inelastic material such as steel belt that may be tightened for very strong engagement with the wheel (for example, if used in a racing car, or other high performance vehicle). While these are two potential embodiments, the inner belt 30 may have other forms and materials, or it may be omitted entirely, or made integral with the inner tube 20, and such alternative configurations should be considered within the scope of the present invention.

In the embodiment of FIG. 1, the flat tire airbag system 10 further includes a plurality of puncture-resistant plates 40 disposed over the outer portion 24 of the inner tube 20. Each of the plurality of puncture-resistant plates 40 has side edges 42 and end edges 44, and the end edges 44 may overlap each other, especially in the collapsed configuration discussed below, and shown in FIG. 2. The puncture-resistant plates 40 are mounted on the flat tire airbag system 10 with a mounting system 45 to protect the inner tube 20 from damage when the inner tube 20 is inflated. The puncture-resistant plates 40 in particular protect the inner tube 20 from nails or other debris that may have punctured the pneumatic tire and caused the flat in the first place.

Figure 2:
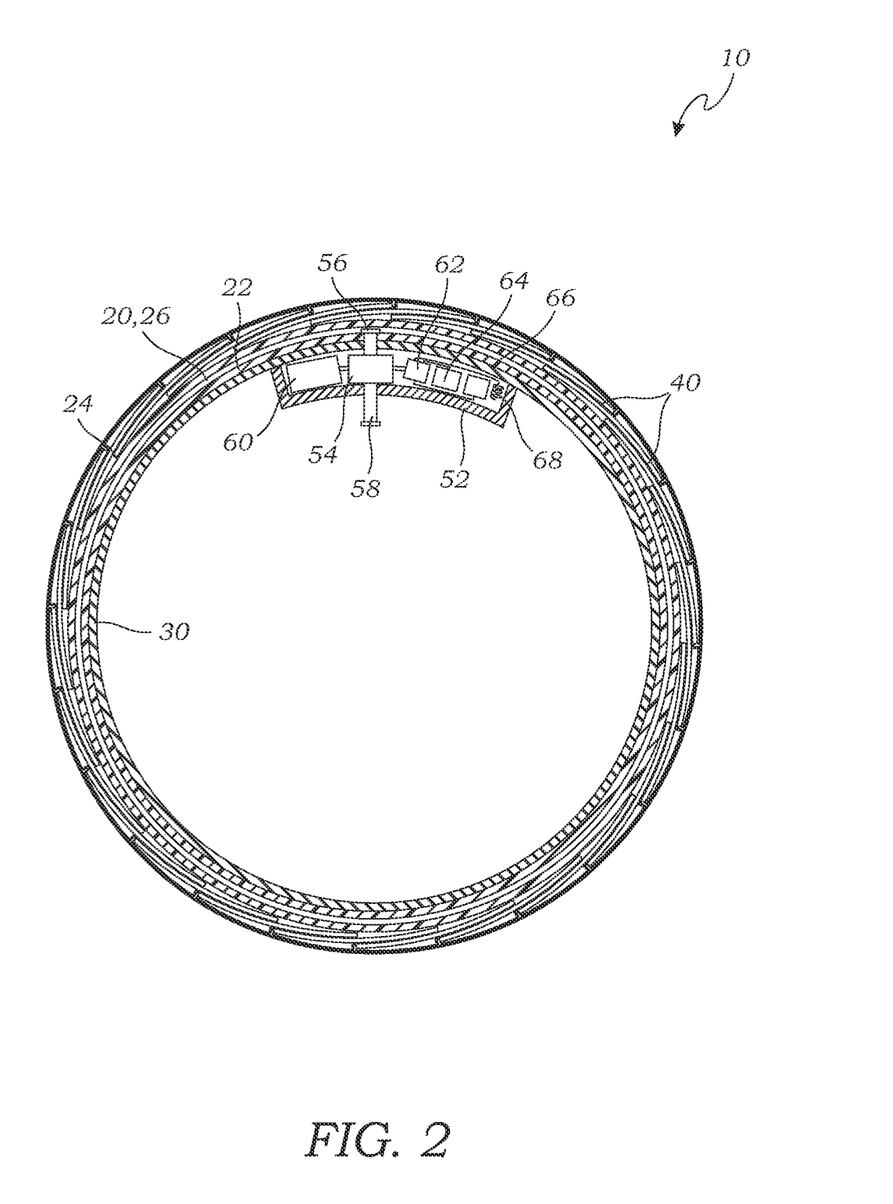
FIG. 2 is a side cross-section view of the flat tire airbag system of FIG. 1, illustrating the flat tire airbag system in a collapsed configuration.

In the embodiment of FIG. 1, the mounting system 45 of the flat tire airbag system 10 includes a pair of annular belts 48 each disposed on opposite sides of the flat tire airbag system 10 (e.g., adjacent the inner portion 22 of the inner tube 20, of in other locations), and the puncture-resistant plates 40 are each attached to one of the pair of belts 48 with elastic cords 46. The elastic cords 46 hold the puncture-resistant plates 40 in a collapsed position, adjacent the inner portion 22 of the inner tube 20, when the system 10 is deflated, as shown in FIG. 2, but are elastic enough to enable the puncture-resistant plates 40 to move to the inflated position when the inner tube 20 is inflated, as shown in FIG. 1. In the inflated position, the puncture-resistant plates 40 are adjacent the tire portion of the pneumatic tire. While one mounting mechanism of the puncture-resistant plates 40 is shown, alternative forms of the mounting system 45 may also be used (e.g., any arrangement of straps, elastic bungees, and other fasteners and fastening systems for attaching the puncture-resistant plates 40 to the inner tube 20, or otherwise associated with the inner tube 20, or other retaining mechanisms designed by one skilled in the art), and such alternative mounting mechanisms should be considered within the scope of the present invention.

The flat tire airbag system 10 further includes an airbag inflation mechanism 50 for immediately inflating the inner tube 20 in the event of a blowout or other form of flat tire. The airbag inflation mechanism 50 is described in greater detail below.

Figure 3:
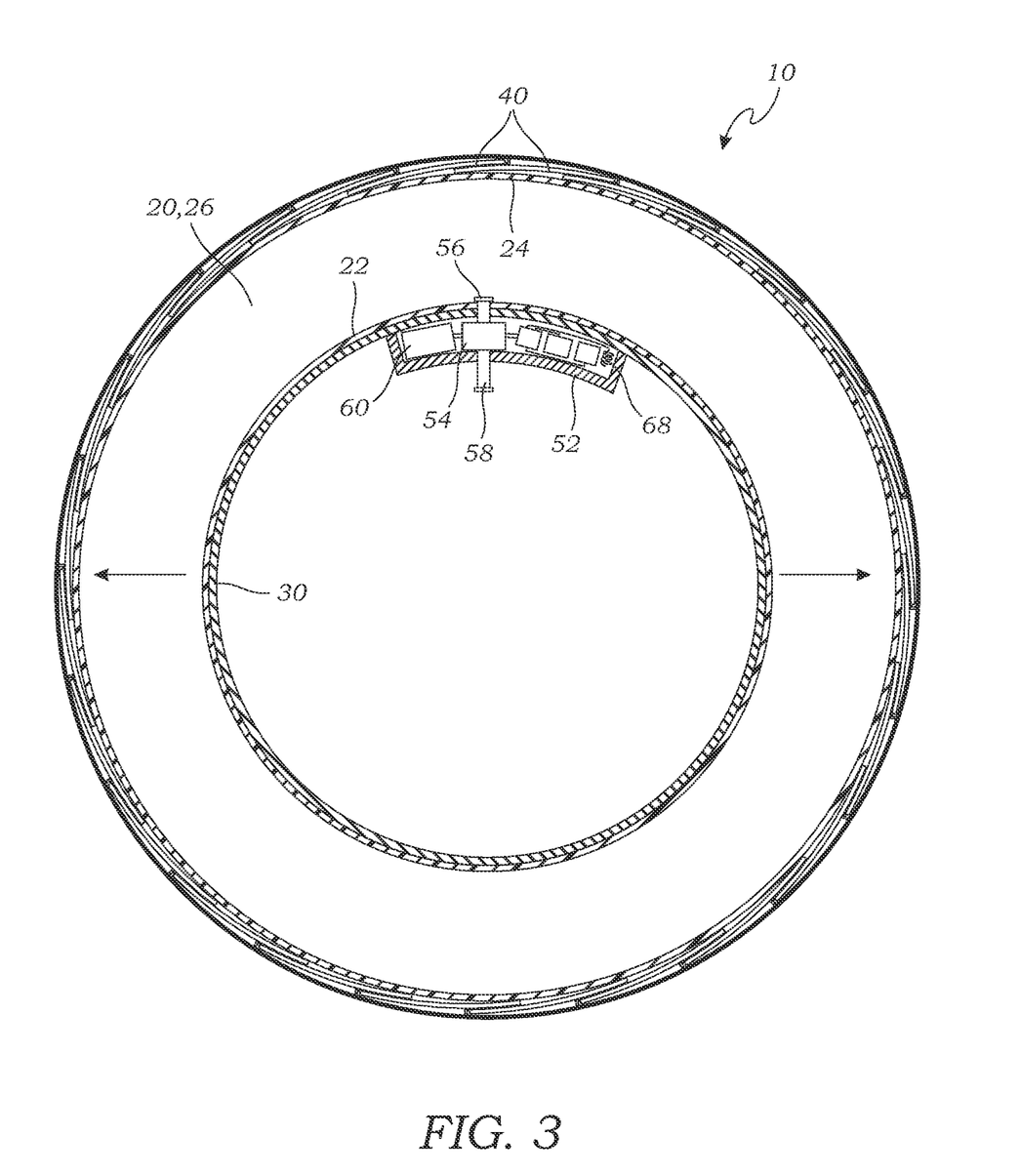
FIG. 3 is a side cross-section view of the flat tire airbag system of FIG. 1, illustrating the flat tire airbag system in the inflated configuration.
Figure 4:
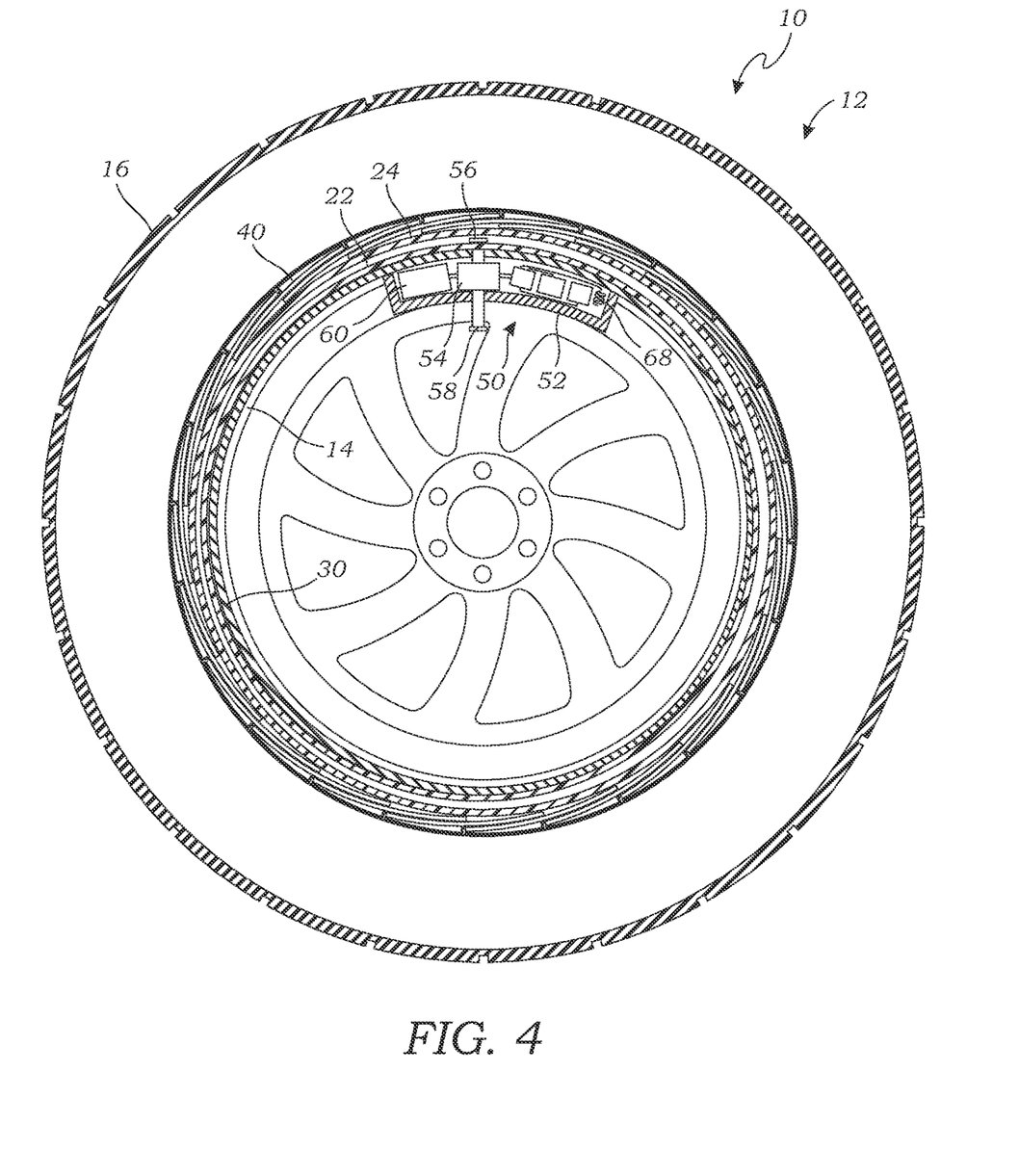
FIG. 4 is a side cross-section view of the flat tire airbag system once it has been installed on a pneumatic tire having a wheel and a tire, illustrating the flat tire airbag system in a collapsed configuration.
Figure 5:
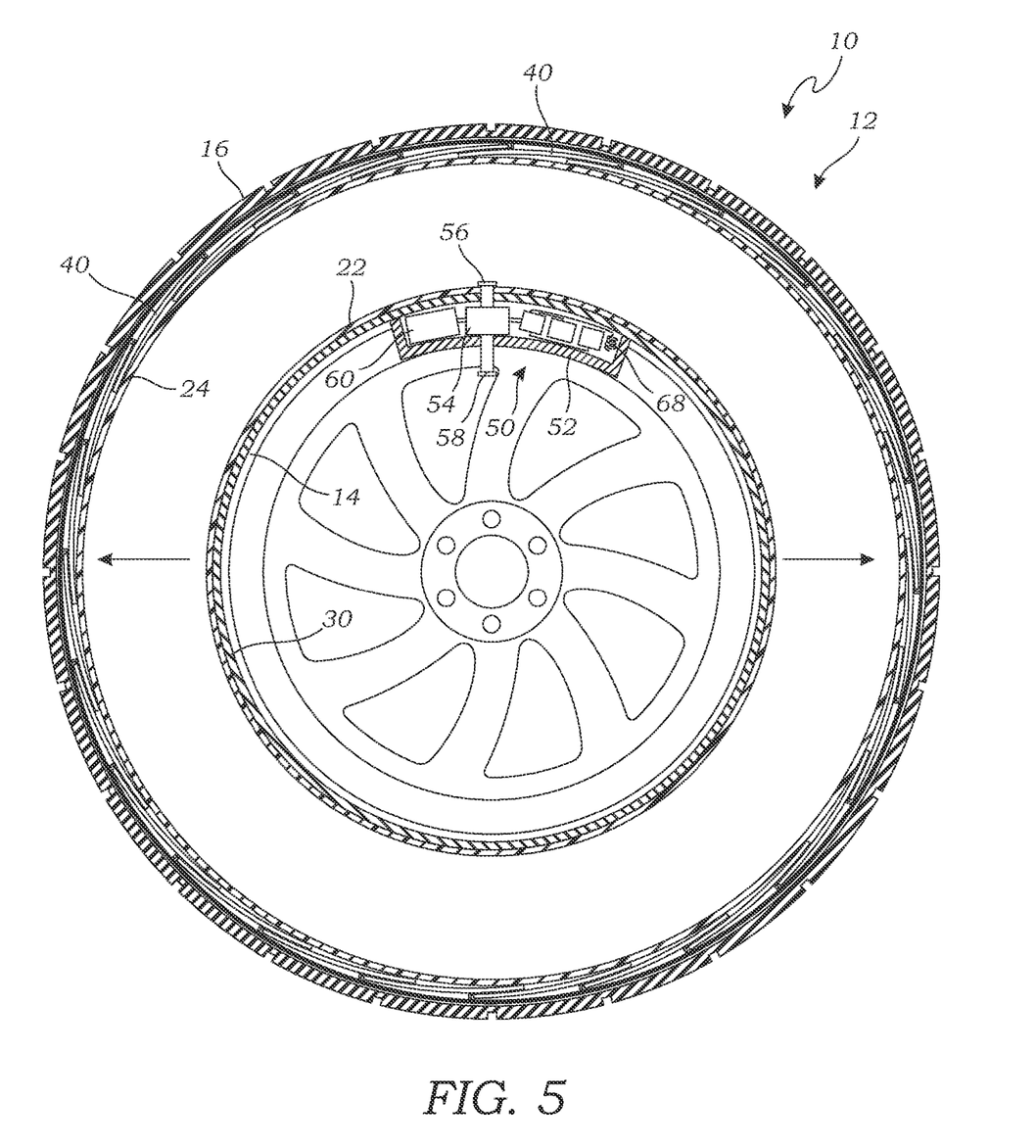
FIG. 5 is a side cross-section view of the flat tire airbag system once it has been installed on a pneumatic tire having a wheel and a tire, illustrating the flat tire airbag system in the inflated configuration.

FIG. 2 is a side cross-section view of the flat tire airbag system 10 of FIG. 1, illustrating the flat tire airbag system 10 in a collapsed configuration. FIG. 3 is a side cross-section view of the flat tire airbag system of FIG. 1, illustrating the flat tire airbag system 10 in the inflated configuration, similar to FIG. 1. FIGS. 2-3 are shown without the pneumatic tire, for greater clarify. As shown in FIGS. 1-3, the flat tire airbag system 10 is initially provided in the collapsed configuration for installation on a pneumatic tire as shown in FIGS. 4-5. Upon detection of a flat tire (e.g., a blowout, or other form of flat tire), the flat tire airbag system 10 inflates to the inflated configuration of FIG. 3 to support the pneumatic tire.

As shown in FIG. 2, the airbag inflation mechanism 50 may be mounted on the inside of the inner belt 30, where it can nest into an inner depression of the pneumatic tire (not shown). In alternative embodiments, the airbag inflation mechanism 50 may be located in alternative locations, such as within the inner tube 20, or on a side surface, or any other location that is protected from damage. The airbag inflation mechanism 50 may be mounted within a housing 52 so that a first stem 56 extends into the inner tube 20, and a second stem 58 extends outwardly for access by a technician (e.g., for deflating the system 10). In this embodiment, the second stem 58 is positioned to extend through the wheel for easy access. The airbag inflation mechanism 50 is discussed in greater detail below, and shown in FIG. 6.

FIG. 4 is a side cross-section view of the flat tire airbag system 10 once it has been installed on a pneumatic tire 12 having a wheel 14 and a tire 16, illustrating the flat tire airbag system 10 in the collapsed configuration. As shown in FIG. 4, in this configuration, the flat tire airbag system 10 does not interfere with the normal operation of the pneumatic tire 12.

FIG. 5 is a side cross-section view of the flat tire airbag system 10 once it has been installed on the pneumatic tire 12, illustrating the flat tire airbag system 10 in the inflated configuration. As shown in FIG. 5, once the flat tire airbag system 10 has been inflated, it supports the tire 16 so that the pneumatic tire 12 is able to maintain normal operations.

Figure 6:
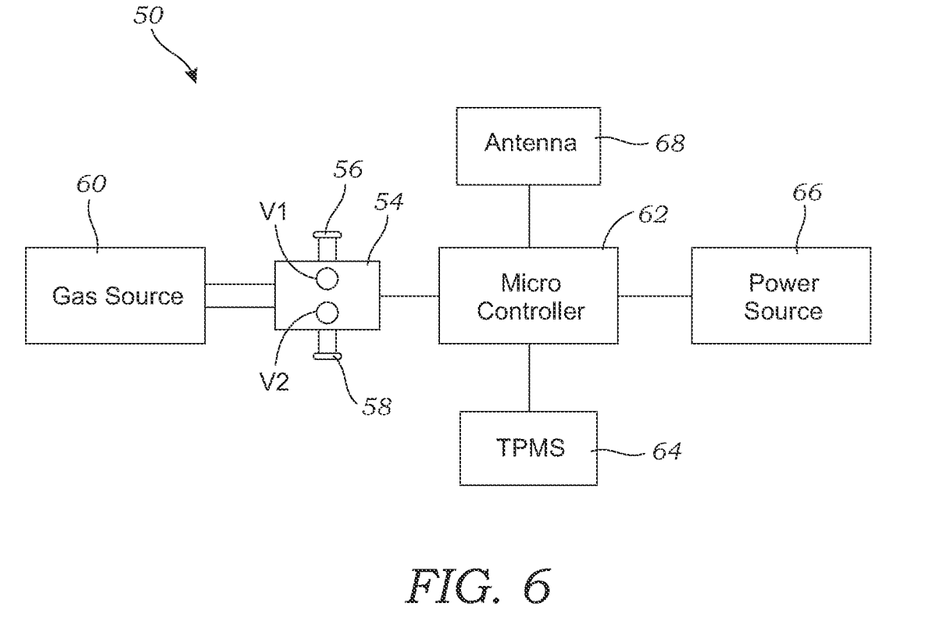
FIG. 6 is a block diagram of an airbag inflation mechanism used to inflate the flat tire airbag system.

FIG. 6 is a block diagram of an airbag inflation mechanism 50 used to inflate the flat tire airbag system 10. As shown in FIGS. 2 and 6, the airbag inflation mechanism 50 is adapted for automatically inflating the inner tube 20 responsive to a tire pressure monitoring system ("TPMS") 64 detecting a loss of pressure within the pneumatic tire. The airbag inflation mechanism 50 may include a valve housing 54 that includes a first stem 56 having a first valve 56 V1, the first stem 56 extending into the inner tube 20. The valve housing 54 may also have a second stem 58 having a second valve V2, the second stem 58 extending outwardly for access by a technician for deflating the system 10. The valve housing 54 is operably connected to a gas source 60, which provides gas for inflating the inner tube 20. In one embodiment, the gas source 60 may include a cannister of pressurized gas. When the first valve V1 opens responsive to the TPMS 64, immediately upon detection of a loss of pressure by the tire pressure monitoring system 64, the pressurized gas is able to flow into the inner tube 20 to inflate the inner tube 20. For purposes of this application, the term "immediately" is defined to mean fast enough to help prevent a loss of control of a vehicle from a blowout, typically less than 1 second.

In another embodiment, the gas source 60 is in the form of a gas generator that uses a propellant to generate pressurized gas which is directed into the inner tube 20 immediately upon detection of a loss of pressure by the tire pressure monitoring system 64. In one embodiment, the propellant includes sodium azide, and in another embodiment, the propellant includes Sr complex nitrate, (Sr (NH$_2$NHCONHNH$_2$)—(NO$_3$)$_2$) of carbohydrazide (SrCDH) with an oxidizing agent. Other propellants known in the art, or later developed, may also be used, and should be considered within the scope of the present invention.

In one embodiment, the tire pressure monitoring system 56 is an indirect tire pressure monitoring system, and may utilize any number of systems known in the art for this purposes. In another embodiment, the tire pressure monitoring system 56 is a direct tire pressure monitoring system, and may include a pressure sensor (not shown) operably positioned within the first valve 56, or in other suitable locations that may be selected by one skilled in the art.

As shown in FIG. 6, the airbag inflation mechanism 50 may include a microcontroller 62 (defined to include any form of computer mechanism or controller known in the art) which is operably connected to the TPMS 64, as well as to a power source 66, and may be further connected to an antenna 68 or other mechanism for external communication. The power source 66 may be a battery, and/or may include a wireless power source (e.g., which generates power based upon the movement of the wheel, for example).

In use, when the pneumatic tire is punctured or otherwise loses pressure (i.e., beyond a predetermined threshold of pressure), the TMPS detects the loss of pressure, and immediately triggers the airbag inflation mechanism 50, so that the inner tube 20 is immediately (within less than 1 second) is inflated to support the tire so that it remains in a fully inflated condition. This prevents a potential loss of control even in the event of a blowout, and enables the driver to continue driving until replacement of the pneumatic tire is convenient and safe.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A flat tire airbag system for use with a pneumatic tire having a wheel portion and a tire portion, the flat tire airbag system comprising:
    an inner tube having an inner portion adapted to be mounted upon the wheel portion of the pneumatic tire, and an outer portion adapted to support the tire portion when inflated;
    a tire pressure monitoring system operably mounted to monitor pressure within the pneumatic tire;
    an airbag inflation mechanism for automatically inflating the inner tube responsive to the tire pressure monitoring system detecting a loss of pressure within the pneumatic tire;
    a pair of annular belts, each positioned on opposite sides of the inner tube, adjacent the inner portion of the inner tube;
    a plurality of puncture-resistant plates disposed over the outer portion of the inner tube, each of the plurality of puncture-resistant plates having side edges that are each attached to one of the pair of belts with elastic cords; and
    wherein the elastic cords hold the plurality of puncture-resistant plates in a collapsed position, adjacent the inner portion of the inner tube, when the inner tube is deflated, but are elastic enough to enable the puncture-resistant plates to move to the inflated position when the inner tube is inflated, wherein when in the inflated position, the puncture-resistant plates are adjacent the tire portion of the pneumatic tire.

2. The flat tire airbag system of claim 1, wherein the airbag inflation mechanism includes a cannister of pressurized gas, and a valve that opens to allow the pressurized gas to flow into the inner tube immediately upon detection of the loss of pressure by the tire pressure monitoring system.

3. The flat tire airbag system of claim 1, wherein the airbag inflation mechanism includes a gas generator that uses a propellant to generate pressurized gas which is directed into the inner tube immediately upon detection of the loss of pressure by the tire pressure monitoring system.

4. The flat tire airbag system of claim 3, wherein the propellant includes sodium azide.

5. The flat tire airbag system of claim 3, wherein the propellant includes Sr complex nitrate, (Sr (NH$_2$NHCONHNH$_2$)·(NO$_3$)$_2$) of carbohydrazide (SrCDH) with an oxidizing agent.

6. The flat tire airbag system of claim 1, wherein the tire pressure monitoring system is an indirect tire pressure monitoring system.

7. The flat tire airbag system of claim 1, wherein the tire pressure monitoring system is a direct tire pressure monitoring system.

8. The flat tire airbag system of claim 7, wherein the tire pressure monitoring system includes a pressure sensor operably positioned within a valve mechanism of the airbag inflation mechanism.

9. The flat tire airbag system of claim 1, further comprising an inner belt that is disposed inside of the inner portion of the inner tube, the inner belt being configured to tightly conform to the wheel portion of the pneumatic tire.

10. The flat tire airbag system of claim 9, wherein the inner belt is constructed of neoprene.

11. The flat tire airbag system of claim 9, wherein the inner belt is constructed of an inelastic material.

* * * * *